Feb. 24, 1948.    L. H. HORNBROOK, JR., ET AL    2,436,694
DETACHABLE SPROCKET WHEEL

Filed Aug. 7, 1946

INVENTORS
OTTO CULLMAN
LESTER H. HORNBROOK, JR
NORMAN B. WEINKE
BY
ATTORNEYS

Patented Feb. 24, 1948

2,436,694

UNITED STATES PATENT OFFICE 2,436,694

DETACHABLE SPROCKET WHEEL

Lester H. Hornbrook, Jr., Norman B. Wienke, and Otto Cullman, Chicago, Ill., assignors to Cullman Wheel Company, Chicago, Ill., a corporation of Illinois Application August 7, 1946, Serial No. 688,988

14 Claims. (Cl. 74—243)

This invention relates to improvements in interchangeable sprocket wheels and hubs and particularly to improvements in the manner of mounting and securing the sprocket wheel on the hub and securing the hub on its shaft.

The main objects of this invention are to provide an improved detachable sprocket wheel and hub whereby a hub of standard size for a predetermined shaft diameter may be used with a wide range of sprocket wheels of various diameters and tooth pitch; to provide an improved separable sprocket wheel and hub construction; to provide such construction that will permit quick and easy interchangeability of sprocket wheels; to provide an improved arrangement for removably mounting a sprocket wheel on a hub; to provide such a means that is self-aligning and capable of accommodating small errors in manufacture of the wheels and hubs; and to provide such an arrangement which, when used with split hubs, will simultaneously secure the wheel on the hub and clamp the hub onto a shaft.

Figure 1:
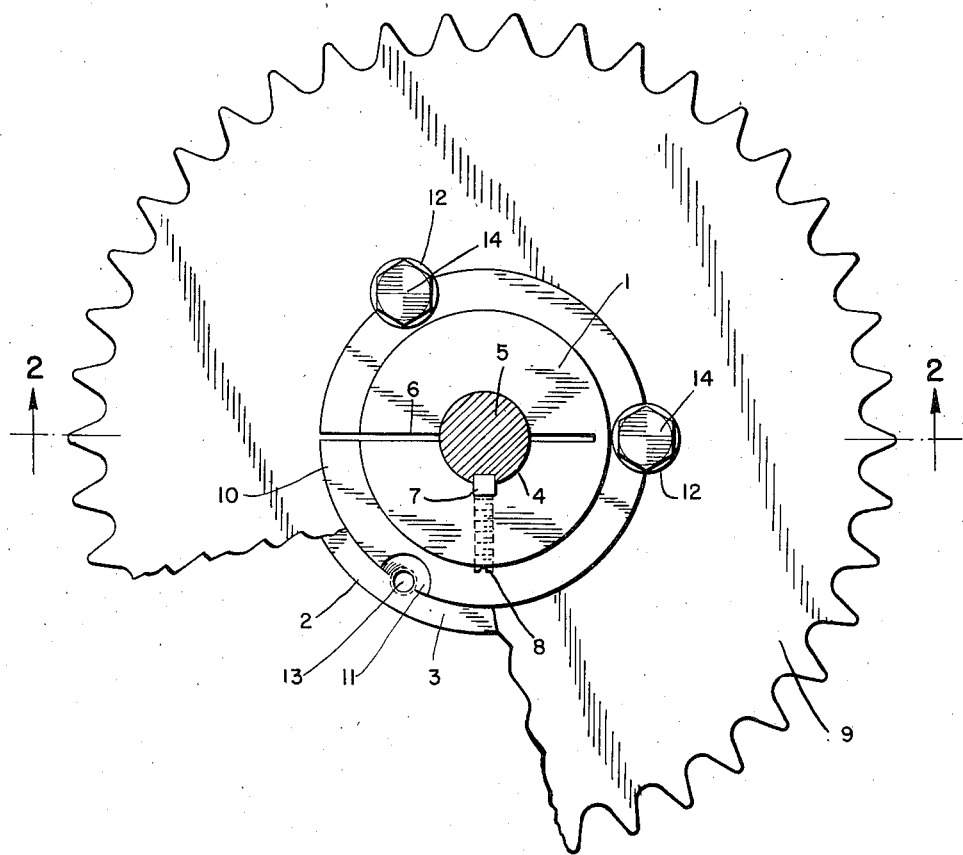
Figure 2:
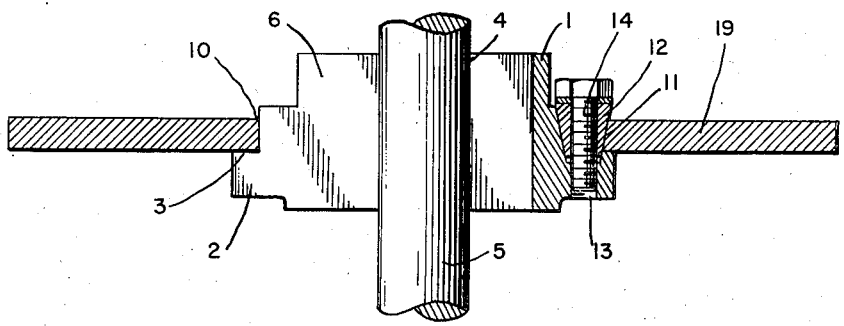

A specific embodiment of this invention is shown in the accompanying drawings in which:

Figure 1 is a plan view, partly broken away, showing the improved separable sprocket and hub arrangement, and Fig. 2 is a sectional view of the same as taken on line 2—2 of Fig. 1, showing in detail one of the means for securing the wheel on the hub and clamping the hub on a shaft.

In the form shown in the drawings the improved device comprises a hub 1, which may be a casting of any suitable material, having a radial flange-like portion 2 to provide a lateral shoulder 3 disposed between or intermediate the ends of the hub. The hub 1 is also provided with the usual bore 4 to receive the shaft 5 on which the hub is mounted, and the body of the hub is radially split, as by a saw-cut, at 6 to permit frictional clamping of the hub onto the shaft 5.

As shown the split or cut 6 extends radially from one side of the hub body through and beyond the bore 4 and terminates somewhat short of the opposite side of the hub leaving sufficient body to adequately connect the two halves of the hub and yet permit adequate flexibility for shaft clamping purposes as will be hereafter described. A keyway may be formed on one side of the bore 4 to receive the usual key 7, which prevents turning of the hub relative to the shaft, and a set screw 8 extending radially through the hub body may be provided to secure the key 7.

The sprocket or wheel 9 may be of any desired form having a central bore or aperture to receive and fit the body of the hub 1 adjacent the shoulder 3. In the form shown the wheel 9 is a disc which seats directly on the shoulder 3, the disc being fitted onto the hub axially and the margin of the wheel bore fitting the hub body to form an axial parting line 10 between the hub and the wheel.

The wheel 9 is secured onto the hub 1 by means of a plurality of tapered bushings, or bushing members, which are seated in suitable axially extending, angularly spaced sockets, formed in the wheel and hub so as to intersect the parting line 10, the shoulder 3 having a bore aligned with each socket to receive a suitable securing member or means passing through the bushing, arranged to force the bushing wedgingly between the wheel and the hub.

In the form shown three such sockets 11 are provided and these are located so as to be substantially centered on the parting line 10, one-half of each socket being formed in the body of the hub 1 and the other half being formed in the margin of the wheel bore. The sockets 11 are tapered, preferably conical in form, and the socket walls converge toward the shoulder 3. The tapered members or bushings 12 are also preferably conical to fit into the sockets 11 and each bore 13 in the shoulder 3, at the base of each socket and extending through the flange portion 2, is tapped or threaded to receive a bolt 14. Each bore 13 is substantially concentric, or aligned, with its respective socket 11 and the securing means or bolts 14 are preferably a loose fit in the bore of the bushings 12.

The angular spacing of the sockets 11 is preferably such that the distances between them are equal, in order to maintain balance in the assembly, and the sockets 11 are located so that there will be at least one socket on each side of the split or cut 6 in the hub 1 and in adjacent quadrants of the hub on the side from which the split or cut 6 enters the hub. When three sockets 11 are employed as shown in Fig. 1, those on either side of the split 6 will be equidistant from the split and the third socket will be located on the opposite side of the hub in alignment with the split or cut, the angular spacing of the sockets being 120°. Such an arrangement is preferable as it gives balance and affords an equal distribution of the clamping and securing forces.

In the assembly and use of the improved separable wheel and hub, the sprocket wheel is first fitted onto the hub so as to rest against the shoulder 3 and then the wheel is rotated relative to the hub, as may be necessary, to register the socket portions of the wheel with the socket portions of the hub. The tapered bushings 12 are then positioned in the sockets and the securing means or bolts 14 are set into place and lightly drawn up. The hub 1 is then set in the desired position on the shaft 5 and the securing bolts 14 are drawn up tightly and substantially uniformly to wedge the tapered bushings 12 into the sockets.

The wedging action of the tapered bushings not only securely clamps the sprocket wheel to the hub, but also serves to compress the split portions of the hub toward each other so as to securely clamp the hub onto the shaft 5. As will be seen from Fig. 1, the bushings 12 nearest the side of the hub from which the split or cut 6 enters, in their wedging action between the inner-periphery of the wheel bore and the body of the hub, will tend to squeeze that portion of the hub in the direction to close the split or cut 6 thereby clamping the hub onto the shaft 5.

It will be understood that the material of the hub will be of sufficient resiliency to provide adequate yielding at the inner terminus of the split 6 to permit the clamping action and by substantially uniform drawing up of the securing means 14, the hub and sprocket will be maintained in a substantially balanced state. It is contemplated that the hub 1 will be of standard size in so far as external measurements are concerned for a variety of shaft sizes and diameters of the hub bore 4. Thus a large range of sprocket wheel sizes may be provided each with a central bore of a standard size to fit the body of the hub at the base of the shoulder 3. It is also contemplated that the tapered sockets 11, bushings 12 and securing members 14 will be of a standard size.

Thus a hub having a bore for a given shaft size may be used with a wide range of sprocket wheel sizes, or pitch diameters, and a sprocket wheel of one size may be readily interchanged with a sprocket wheel of a different size, using the same hub, and without necessarily removing the hub from the shaft on which it is mounted; it being only necessary to remove the securing members 14 and the tapered bushings 12 in order to effect change of sprocket size.

The main advantages of this invention reside in the ease with which the wheel can be detached from the hub and replaced with another wheel of a different size without detracting from the operative security of the device as assembled for use.

Other advantages lie in the application of the wedging members or tapered bushings which not only firmly secure and key the wheel to the hub, but also serve as hub compressing means to firmly clamp the hub to its shaft and secure the assembly against axial shifting.

Further advantages of the improved construction reside in its simplicity and the ease of its manufacture to standard specifications which permits a great reduction in the stock or inventory of sprocket wheels which must be carried to accommodate the large variety of specifications found in the field of their use. Thus it is only necessary to stock hubs for the standard shaft diameters and a series of sprocket wheels of the various pitched diameters and tooth arrangements. From such a stock, a sprocket wheel and hub combination can be readily made up to suit substantially any specification by merely picking a sprocket wheel having the desired pitched diameter and toothed characteristic and combining the same with a standard hub having a proper bore for the shaft on which it is to be mounted.

Although but one specific embodiment of this invention is herein shown and described, it will be understood that details of the construction shown may be altered or omitted without departing from the spirit of this invention as defined by the following claims.

We claim:

1. A device of the class described comprising a split hub adapted to be secured on a shaft, said hub having an annular shoulder intermediate its ends, a wheel fitted onto said hub and seated against said shoulder, said hub and wheel having a socket on each side of the split in said hub intersecting the axial parting line between said hub and wheel, a tapered member seated in each socket, and securing means arranged to force said tapered members into wedging engagement between said hub and wheel.

2. A device of the class described comprising a hub split radially and adapted to be secured on a shaft, said hub having an annular shoulder intermediate its ends, a wheel fitted onto said hub and seated against said shoulder, said hub and wheel having a socket on each side of the split in said hub in adjacent quadrants thereof and intersecting the axial parting line between said hub and wheel, a tapered member seated in each socket, and securing means arranged to force said tapered members into wedging engagement between said hub and wheel.

3. A device of the class described comprising a split hub adapted to be secured on a shaft, said hub having an annular shoulder intermediate its ends, a wheel fitted onto said hub and seated against said shoulder, said hub and wheel having a socket on each side of the split in said hub intersecting the axial parting line between said hub and wheel, said hub shoulder having a bore at the base of each socket substantially concentric therewith, a tapered bushing member seated in each socket, and securing means extending through each bushing into the respective bore and arranged to force said bushing into wedging engagement between said hub and wheel.

4. A device of the class described comprising a hub having a central shaft receiving bore and being split radially from one side through and beyond said bore, an annular shoulder on said hub intermediate its ends, a wheel fitted onto said hub and seated against said shoulder, said hub and wheel having a plurality of angularly spaced sockets each intersecting the axial parting line between said hub and wheel, a pair of said sockets being separated by the split in said hub and disposed on the side thereof from which said split opens, a tapered bushing seated in each socket, and securing means arranged to force said bushings into wedging engagement between said hub and wheel.

5. A device of the class described comprising a hub having a central shaft receiving bore and being split radially from one side through and beyond said bore, an annular shoulder on said hub intermediate its ends, a wheel fitted onto said hub and seated against said shoulder, said hub and wheel having a plurality of angularly spaced sockets each intersecting the axial parting line between said hub and wheel, a pair of said sockets being separated by the split in said hub and disposed on the side thereof from which said split opens, said hub shoulder having a bore at the base of each socket substantially concentric therewith, a tapered bushing seated in each socket and securing means extending through each bushing into the respective bore and arranged to force said bushing into wedging engagement between said hub and wheel.

6. A device of the class described comprising a hub having a central shaft receiving bore and being split radially from one side, an annular shoulder on said hub intermediate its ends, a wheel fitted onto said hub and seated against said shoulder, said hub and wheel having a plurality of angularly spaced sockets each intersecting the axial parting line between said hub and wheel, a pair of said sockets being separated by the split in said hub and disposed on the side thereof from which said split opens and a third socket being disposed in alignment with the split, said hub shoulder having a bore at the base of each socket substantially concentric therewith, a tapered bushing seated in each socket, and securing means extending through each bushing into the respective bore and arranged to force the bushing into wedging engagement between said hub and wheel.

7. A device of the class described comprising a radially split hub adapted to be mounted on a shaft and having an annular shoulder intermediate its ends, a wheel fitted onto said hub axially and seated against said shoulder, said hub and wheel having a tapered socket on each side of the split in said hub in adjacent quadrants thereof and intersecting the axial parting line between said hub and wheel, said hub shoulder having a bore at the base of each socket substantially concentric therewith, a conical bushing seated in each socket, and securing means extending through each bushing into the respective bore and arranged to force the bushing into wedging engagement between said hub and wheel.

8. A device of the class described comprising a hub split radially from one side and adapted to be mounted on a shaft, said hub having an annular shoulder intermediate its ends, a wheel fitted onto said hub axially and seated against said shoulder, said hub and wheel having a tapered socket on each side of the split in said hub in adjacent quadrants thereof and a third tapered socket on the opposite side of the hub aligned with the split, each of said sockets intersecting the axial parting line between said hub and wheel, said hub shoulder having a bore at the base of each socket substantially concentric therewith, a conical bushing seated in each socket, and securing means extending through each bushing into the respective bore and arranged to force the bushing into wedging engagement between said hub and wheel.

9. A device of the class described comprising a hub split radially from one side and adapted to be secured on a shaft, said hub having an annular shoulder intermediate its ends, a wheel fitted onto said hub axially and seated against said shoulder, said hub and wheel having a tapered socket on each side of the split in said hub and substantially centered on the axial parting line between said hub and wheel, said hub shoulder having a tapped bore at the base of each socket and substantially concentric therewith, a conical bushing seated in each socket, and a bolt extending through each bushing and threaded into the respective bore to force said bushing into wedging engagement between said hub and wheel.

10. A device of the class described comprising a hub split radially from one side and adapted to be secured on a shaft, said hub having an annular shoulder intermediate its ends, a wheel fitted onto said hub axially and seated against said shoulder, said hub and wheel having a tapered socket equidistant on each side of the split in said hub and a third tapered socket aligned with the split, each of said sockets being substantially centered on the axial parting line between said hub and wheel, said hub shoulder having a tapped bore at the base of each socket and substantially concentric therewith, a conical bushing seated in each socket, and a bolt extending through each bushing and threaded into the respective bore to force said bushing into wedging engagement between said hub and wheel.

11. A device of the class described comprising a hub having a shaft receiving bore and a peripheral shoulder intermediate its ends, a wheel fitted onto said hub and seated against said shoulder, said wheel having a central bore to receive said hub, said wheel and hub having a plurality of angularly spaced sockets disposed to intersect the axial parting line between the margin of the wheel bore and the body of said hub, a tapered member seated in each socket, and securing means arranged to force said tapered members into wedging engagement between said wheel and hub.

12. A device of the class described comprising a hub having a shaft receiving bore and a peripheral shoulder intermediate its ends, a wheel fitted onto said hub and seated against said shoulder, said wheel having a central bore to receive said hub, said wheel and hub having a plurality of angularly spaced tapered sockets disposed to intersect the axial parting line between the margin of the wheel bore and the body of said hub, a tapered bushing seated in each socket, and securing means arranged to force said tapered bushings into wedging engagement between said wheel and hub.

13. A device of the class described comprising a hub having an annular body and a central shaft receiving bore, a peripheral shoulder on said hub, a wheel having a central bore formed to fit and receive the body of said hub with the margin of the wheel bore seated against said shoulder, said wheel and hub having a plurality of angularly spaced inwardly tapered sockets substantially centered on the axial parting line between the margin of the wheel bore and the body of said hub, a conical bushing seated in each of said sockets, and a securing member extending through each bushing into said hub shoulder and arranged to force the bushing into wedging engagement between said wheel and hub.

14. A device of the class described comprising a hub having an annular body and a central shaft receiving bore, a peripheral shoulder on said hub, a wheel having a central bore formed to fit and receive the body of said hub with the margin of the wheel bore seated against said shoulder, said wheel and hub having a plurality of angularly spaced inwardly tapered sockets substantially centered on the axial parting line between the margin of the wheel bore and the body of said hub, said hub shoulder having an aperture at the base of each socket and substantially aligned therewith, a conical bushing seated in each of said sockets, and a securing member extending loosely through each bushing into the respective aperture in said hub shoulder and arranged to force the bushing into wedging engagement between said wheel and hub.

LESTER H. HORNBROOK, Jr.
NORMAN B. WIENKE.
OTTO CULLMAN.